(12) United States Patent
Polly et al.

(10) Patent No.: US 10,255,317 B2
(45) Date of Patent: Apr. 9, 2019

(54) COARSE GRAINED CLIENT INTERFACE

(71) Applicants: Adam Polly, Stutensee (DE); Carsten Schminke, Zwingenberg (DE); Thomas Gauweiler, Speyer (DE)

(72) Inventors: Adam Polly, Stutensee (DE); Carsten Schminke, Zwingenberg (DE); Thomas Gauweiler, Speyer (DE)

(73) Assignee: SAP SE, Walldorf (DE)

( * ) Notice: Subject to any disclaimer, the term of this patent is extended or adjusted under 35 U.S.C. 154(b) by 585 days.

(21) Appl. No.: 14/051,874

(22) Filed: Oct. 11, 2013

(65) Prior Publication Data

US 2015/0106406 A1    Apr. 16, 2015

(51) Int. Cl.
*G06F 17/30* (2006.01)

(52) U.S. Cl.
CPC .............................. *G06F 17/30421* (2013.01)

(58) Field of Classification Search
CPC ............... G06F 17/30312; G06F 17/30; G06F 17/30421
See application file for complete search history.

(56) References Cited

U.S. PATENT DOCUMENTS

| | | | |
|---|---|---|---|
| 2009/0125531 A1* | 5/2009 | Scheerer | G06Q 10/06 |
| 2012/0005179 A1* | 1/2012 | Thimmel | G06Q 10/10 |
| | | | 707/705 |
| 2012/0166398 A1* | 6/2012 | Gauweiler | G06F 17/3056 |
| | | | 707/691 |
| 2012/0174064 A1* | 7/2012 | Polly | G06Q 10/10 |
| | | | 717/120 |
| 2013/0166675 A1* | 6/2013 | Giebel | G06F 17/30011 |
| | | | 709/217 |

* cited by examiner

*Primary Examiner* — Kristopher Andersen
(74) *Attorney, Agent, or Firm* — Fountainhead Law Group P.C.

(57) ABSTRACT

Various embodiments of the present disclosure provide a coarse grained client interface for accessing complex data structures in a storage system. Complex data structures may take the form of business objects (BOs), which may be hierarchically structured. Various embodiments allow for creating, accessing and manipulating one or more BO instances in a storage system using deeply structured data types corresponding to the entire hierarchy of a BO instance or to a substructures of a BO instance.

17 Claims, 9 Drawing Sheets

COARSE GRAINED CLIENT INTERFACE

BACKGROUND

The present disclosure generally relates to computer programming. More specifically, the disclosure relates to an improved client interface for accessing complex data structures.

Unless otherwise indicated herein, the approaches described in this section are not prior art to the claims in this application and are not admitted to be prior art by inclusion in this section.

As one example of a complex data structure, business management software solutions frequently make use of data structures commonly referred to as business objects (BOs), which may be hierarchically structured. Such objects generally correspond to a thing in the real world, and store information relating to that "thing". For example, a business object may be created for a sales order. A sales order business object might contain information about the seller and the customer on a sales order, the product items being purchased, scheduling information regarding shipment, and so forth.

Frequently, this information is organized in a hierarchical fashion. For example, a root sales order node may be created that has information about the seller and the buyer, among other things. The root node may also have one or more product-item sub nodes, each of those nodes containing information about a particular product-item ordered by the customer. Each of the product-item nodes may in turn have a set of line-item sub nodes, each of the line-item sub nodes containing information about a particular shipment, for example. (The nodes are also referred to herein as "sub-elements".) The structure of the hierarchy may be described in association which are stored in the business objects.

It would be advantageous to provide improved systems, techniques and mechanisms for improved client interfaces for accessing complex data structures.

BRIEF SUMMARY

Various embodiments of the present disclosure provide for improved client interfaces for accessing complex data structures. As noted above, complex data structures may take the form of business objects (BOs), which may be hierarchically structured. Various embodiments provide a coarse grained client interface for accessing hierarchically structured data structures in backend systems.

In various embodiments, a client interface is provided that allows for creating, accessing and/or manipulating one or more business object instances using deeply structured BO data types. In some embodiments, the deeply structured data types may correspond to the entire hierarchy of a business object instance or to substructures of a business object instance. In some embodiments, the deeply structured data types are automatically derived from a definition of a business object type.

Various embodiments provide a programming platform that allows a computer programmer to include deeply structured data types in their computer programs. In various embodiments, the use of a coarse grained client interface allows for the manipulation of an entire BO instance or a substructure of the BO instance in one service call between a consumer application server (or a service provider application server) and a backend system where the BO instance is stored.

Note that in some embodiments the backend system may comprise, or be associated with, a service provider system that contains, among other things, both logic for working with BO objects as well as a storage system for storing the BO instances.

Various embodiments provide logic in a backend system for performing particular functions in response to deeply structured data type method calls. In some embodiments, deriving the necessary sub node operations (such as adding or deleting a node or sub node, changing an attribute assignment, etc.) needed to achieve a desired end state in a BO instance is derived automatically by such logic, and the necessary sub node operations are performed by such logic. In some embodiments, a client entity does not need to be aware of which sub node operations are required to bring a BO instance to a requested state.

BRIEF DESCRIPTION OF THE DRAWINGS

Embodiments of the present disclosure are illustrated by the figures of the accompanying drawings which are meant to be exemplary and not limiting, in which like references refer to like or corresponding parts, and in which.

DETAILED DESCRIPTION

Figure 1:
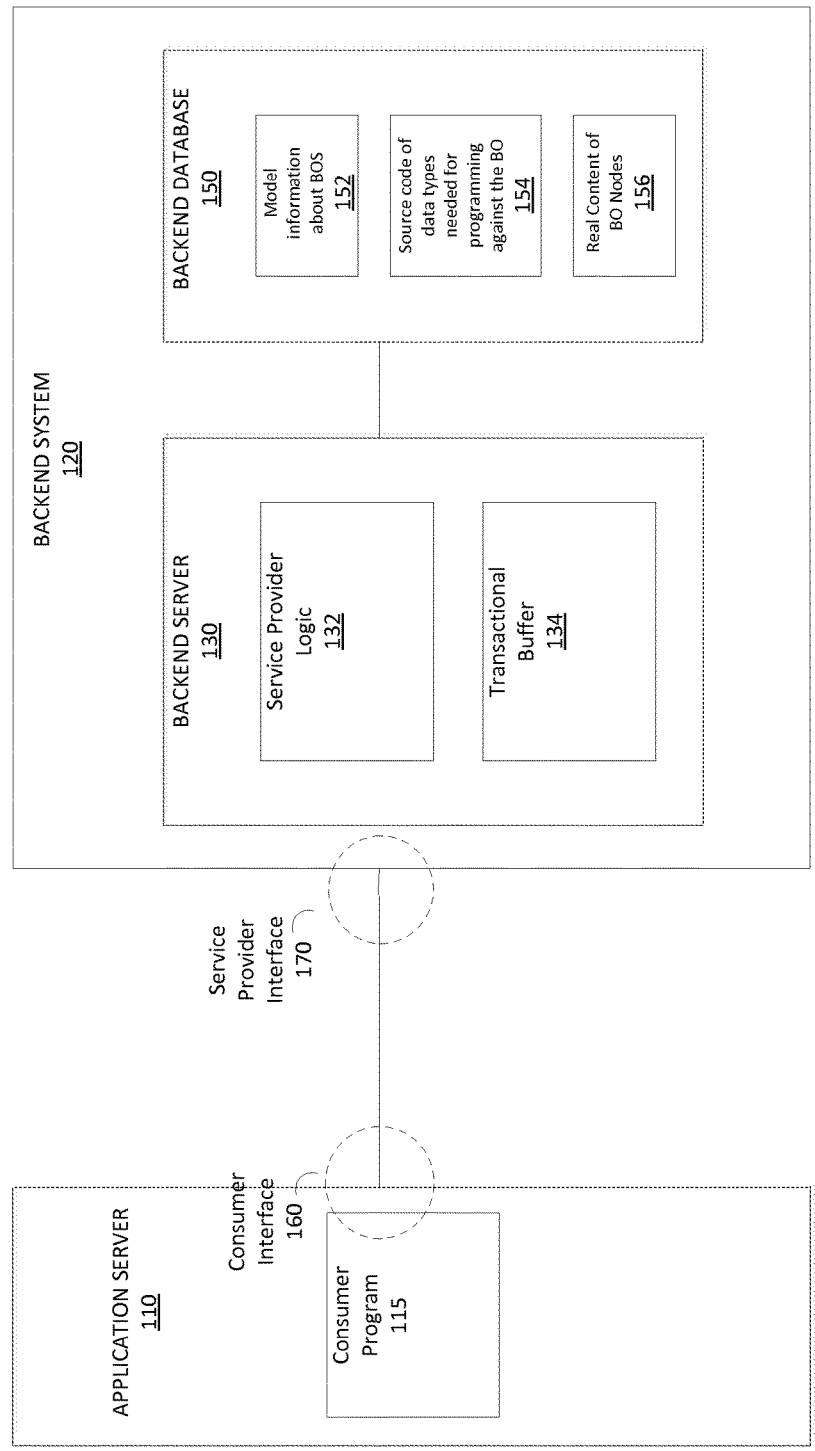
FIG. 1 is a block diagram presenting an application server and backend system according to one embodiment of the present disclosure.

Described herein are improved techniques and systems for providing improved client interfaces for accessing complex data structures. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Embodiments of a method and system for providing improved client interfaces for accessing complex data structures, in accordance with the present disclosure, are described herein with reference to the drawings in FIGS. 1 through 8.

Various embodiments of the present disclosure provide a coarse grained client interface for accessing complex data structures in a backend system. As noted above, complex data structures may take the form of business objects (BOs), which may be hierarchically structured. That is, data stored in a BO may have a hierarchical configuration of nodes: for example, a root node having sub nodes, and one or more of those first level sub nodes having their own sub-nodes, and so on.

In many instances, client interfaces allowing for access to such hierarchically structured data objects in a backend system only provide for access to such data on a node by node basis. In the context of such fine-grained, generic client interfaces, at the coding stage, in some instances, a programmer may need to include a separate method call for each and every node of a hierarchically structured data object from which information is desired. The programmer may also be required to anticipate every operation needed to be performed to create a desired end state: for example, update a node instance, create or delete node instances or sub node instances. Such a coding process is not only time consuming and cumbersome, but also produces unclear computer programming code. Additionally, at run-time, when the application program is run, each access to a node or sub node may require a separate API call, for example. This can result in slower program runtime speeds as well as unnecessary consumption of valuable network resources for transmitting the API calls.

Accordingly, various embodiments allow for creating, accessing and manipulating one or more BO instances using deeply structured data types corresponding to the entire hierarchy of a BO instance or to a substructures of a BO instance. A business object "type" refers to a general class of business object which may itself serve as a template for business object instances. In some embodiments, these deeply structured data types may be derived automatically from a definition of a class of BOs provided to the system at a design stage prior to any programming being done with the BO type.

After this initial design stage, in an application programming stage, various embodiments provide a programming platform that allows a computer programmer to include deeply structured data types in their computer programs. The deeply structured data types may include the data objects themselves as well as methods corresponding to those data objects, by which those objects may be manipulated.

The use of such deeply structured data types can substantially simplify programming code, and also reduce coding time. As an example, according to various embodiments, programmers may be given the ability to produce a desired end-state of a BO instance or substructure of the BO instance simply by specifying in a table the desired data assignments and node structure which they wish to achieve in a BO instance substructure.

Note that while a table is used in various embodiments to hold such desired end state information, in other embodiments, an array or other appropriate data structure could also be used to hold such information.

In some embodiments, the desired end-state may be specified by a user. In other embodiments, the end-state may be specified by another application program or by the same application program which contains the deeply structured data type method calls.

Additionally, various embodiments provide service provider logic capable of working with such deeply structured data type method calls. In some embodiments, such service provider logic may be provided in a system (e.g., a service provider system) that contains or is associated with a backend database where the BO instances are stored. In some instances, the BO related logic may be executed by an application server of a service provider system.

In some embodiments, such service provider logic may process deeply structured data type method calls received from a client application program to create the desired end-state in the BO instance in the backend. In some embodiments, this is achieved by the backend logic reviewing a table sent by a client program to determine the node specific operations required to create the desired end-state and then performing these operations.

Advantages of various embodiments of a coarse grained BO client interface include allowing creating, reading and manipulating of either a whole BO instance or of a substructure of a BO instance in a faster and more convenient way. Advantages also include allowing for a much more intuitive and convenient programming process where the programming involves business objects. Further advantages include reducing the amount of needed computer programming code.

Other advantages of various embodiments include allowing detection at a compilation stage of mistakes in a computer programming code resulting from assigning data of an incorrect data type to a particular method parameter. In many prior systems detection of such errors at the compilation stage could not be achieved because the data types used were of a generic form. In various embodiments, this advantage is achieved through defining method calls for deeply structured data types specifically to be used with one specific deeply structured data-object-type, for example.

Other advantages of various embodiments include reducing the amount of network resources needed to support data calls between a client and a backend. Further advantages include lowering the processing requirements at application servers by moving a substantial amount of the processing work required for client accesses, to the backend system.

As described above, various embodiments of the present disclosure provide a system or method for an improved client interface for accessing BOs. It will be understood, however, that the disclosure is not restricted to use with BOs, or use with hierarchically structured data objects, but may be used in conjunction with facilitating accesses to any complex data structure where simplification of a client/consumer interface would be useful.

It is further noted that, while the terms "backend system" and "service provider system" are sometimes used in this disclosure to describe the system containing the deeply structured data type related logic and data, as further discussed herein, many different configurations of a system for containing such logic and data may be used in actual implementations.

As noted above, in programming software solutions for business management software solutions, the term "business object" is used to refer to programming objects used in programming the software that relates to a particular thing in a real world business context. A business object, for example, may be used to contain information relating to a sales order. Whereas a computer program may implement classes (which typically result in programming objects, such as business objects, managing or executing behaviors), a business object usually does nothing itself but instead holds a set of instance variables or properties (also known as attributes) and associations with other business objects, weaving a map of objects representing the business relationships. The "attributes" may define features of the thing which the business object is related to. The "associations" may define a business object's relationship to other business objects.

In general, a business object is a code construct (e.g., a data structure) that, as noted above, corresponds directly to a thing in the actual business, and the actual business uses software (e.g., a computer program) to manipulate the business object as real-world activities take place that are related to the thing. For example, when a sales order is fulfilled, the business object may be altered to represent data reflecting that real world event.

The business object encapsulates the business logic related to the thing, and encapsulates the data that is required by the logic and also describes, defines, makes up, is contained by, or is associated with the thing. In general, the "thing" is recognizable to a non-technical person familiar with the business, like the users, business analysts, etc. Each object has data that describes or is attributed to the object and methods that make decisions based on that data. For example, a sales order BO may have a customer name attribute and a ordered product attribute (data), and may also have related methods such as create, modify and read for performing actions relating to the BO. Things may be tangible objects with real-world meanings, or may be conceptual objects that relate to the business and its business processes.

As noted above, the general term "business object" may be more precisely stated by using two other terms: business object instance and business object type. A business object instance refers to a specific business object, often including specific data, that is processed by the data processing system; whereas a business object type refers to a general class of business object which may itself serve as a template for business object instances. Example business object types include a purchase order, a sales order, etc.; corresponding instances include a specific purchase order with specific data, a specific sales order with specific data, etc. Embodiments use both business object types (e.g., a particular application may not be configured to access business objects of a particular type) as well as business object instances (e.g., a relationship may link a business object instance with another object); often the general term "business object" may be used to describe both since the more precise term is clear from the context.

Embodiments for an improved platform and interface for working with hierarchical business objects may be implemented in a wide variety of configurations. Turning to FIG. 1, an application server and backend system comprising hardware and software components configured according to one embodiment of the present disclosure is illustrated. The system presented comprises an application server 110 connected to a backend system 120 comprising a backend server 130 and a backend database 150. Application server 110 and backend system 120 are connected by a network link or links 140. Embodiments of the above system may be implemented in a wide variety of network environments including, for example, Ethernet networks, TCP/IP-based networks, telecommunications networks, and wireless networks, etc., or a combination of such networks.

Each of application server 110 and backend server 130 may comprise one or more servers, and may include any suitable modules for performing the functions further discussed herein. As indicated in FIG. 1, application server 110 is connected to network link or links 140 by a client interface 160. In various embodiments, this is the client interface described at various points in the present disclosure. Backend system 120 is connected to network link or links 140 by a service provider interface 170.

Application server 110 is configured to run a first client application program 115 as well as other application programs, in some embodiments.

Backend server 130 shown in FIG. 1 includes a service provider logic module 132 and a transactional buffer 134, which operate together to process deeply structured data type method calls from application server 110, for example. In some embodiments, in conjunction with performing deeply structured data type functionality, backend server 130 further sends and receives data from backend database 150. It will be understood that implementations are contemplated in which backend server 130 can be configured to perform these operations in a variety of different ways and using a variety of different configurations.

Note that backend database 150 will usually be associated with a database server which executes accesses by backend server 130 to backend database 150. That is, in various embodiments, backend system 120 may include both an application server associated with a service provider system (i.e., backend server 130) as well as a database server which acts to provide accesses to backend database 150. It will be understood that as used herein "backend database 150" is intended to cover both a database server associated with backend database 150, as well as the database itself, in such implementations.

As noted above, the backend system may be part of a service provider system that contains both service provider logic performed by an application server, as well as a storage system for containing data, including BO related data. The coarse grained client interface of various embodiments of the present disclosure may be used by a customer entity to access BOs in a service provider system.

It will be understood that, in alternative embodiments, the coarse grained client interface may also be used for BO accesses between one BO service provider system and another BO service provider system.

Providing logic in backend server 130 for performing processing steps relating to deeply structured data types allows application server 110 to access data in backend system 120 using less processing resources and network bandwidth. The inclusion of the service provider logic allows backend system 120 to in effect take over more of the responsibilities for tasks required to access data in hierarchical data structures.

Embodiments of the service provide logic may be integrated as a component of one or more applications or it may be a stand-alone program executing on backend server 130.

Backend database 150 shown in FIG. 1 includes model information about Business Object(s) 152, source code of data types needed for programming against the BO(s) 154, and real content of BO nodes 156.

As noted above, BO types or classes are designed in an initial phase prior to their use in any programming code. Model information 152 about the BOs may be input by an administrator of system 100 or by another entity. Model information 152 may include the attributes to be held by different nodes in the BO, as well as the structure of the BO, for example, as defined by attribute or association data.

Deeply structured data types derived on the basis of such model information 152 may be generated during this initial design phase. In some embodiments, for example, a deeply structured data type may be generated for each node of the BO that has sub nodes. Note this means that, in some embodiments, for each possible substructure of a BO type, a specific data type may be generated.

Further, based on the hierarchically structured types, a set of strongly typed operations may also be generated, each deeply structured data type having a corresponding set of deeply structured data type "methods" or operations, for example. Such a set of methods may include: create, read, update, and delete, for the entire BO instance or a substructure of the BO instance.

Further, in some embodiments, service provide logic (for backend server 130) which supports the use of such method calls and data types, as further described herein, may be created.

In the configuration illustrated in FIG. 1, backend database 150 also includes source code 154 of data types needed for programming against the BOs.

Further, the illustrated backend database 150 also contains real content 156 of the BO nodes. "Real content" refers to data relating specifically to BO instances (versus BO "types" which are defined in the above described model information stage). That is, once, at run time, different BO types are instantiated and are being used in an application program, information regarding the current attribute assignments, and structure (i.e., associations) related to each BO instance may be saved on backend database 150.

Backend database 150 may consist of any medium where a client may store and/or retrieve data. It is contemplated that a wide variety of data repositories could be used to implement various embodiments of the present disclosure. For example, backend database 150 could comprise a database (e.g., a relational database, such as SAP Sybase ASE, MySQL, PostgreSQL, Microsoft SQL Server, or Oracle Database), or an object oriented database), or a distributed data store, among other things.

An example of the significant improvement in programming code provided by various embodiments of the present disclosure is discussed next to help clarify the benefits of various embodiments. As noted above, each of the nodes of a BO instance may have one or more attributes. For example, a root node may contain the header attributes of a sales order object such as node identifier, seller name, buyer name, latest shipping data, and total amount of the order. It may also be associated with one or more product item sub nodes. Each of the product-item sub nodes may contain information about an ordered product and a quantity of the product that was ordered. One or more of these product-item sub nodes may in turn be associated with line-item sub nodes. The line-item sub nodes may contain information about particular shipment where, for example, there are partial shipments, for example.

A traditional interface between a client program and a backend system is organized "node-wise", in the sense that in order to retrieve the data in a business object (BO) instance, data access calls regarding each node of interest must be independently made. For example, first, data on the ROOT node has to be retrieved. Then the sub-node ITEM has to be retrieved with its own program call. When ITEM node instances are present the subnode LINE_ITEM may have to be retrieved along the association from the ITEM to the LINE_ITEM:

Access of the sample data by traditional core services:

Example code for accessing the data in an example sales order instance using traditional core services programming calls may read as follows:

```
data(lo_sales_order_lcp) = cl_ESF_LCP_FACTORY=>GET_READ_ONLY_LCP
( IN_BO_NAME = zbo_sales_order=>CO_BO_NAME ) .
lo_sales_order_lcp->RETRIEVE(
   exporting
      IN_BO_NODE_NAME    = ZBO_SALES_ORDER=>root=>CO_NODE_NAME
      IN_NODE_IDS        = lt_root_node_id_for_lcp
   importing
      out_data           = lt_root
) .
lo_sales_order_lcp->RETRIEVE_by_association(
   exporting
      IN_BO_NODE_NAME    = ZBO_SALES_ORDER=>root=>CO_NODE_NAME
      in_association_name = ZBO_SALES_ORDER=>root=>CO_ASSOCIATION-ITEM
      IN_NODE_IDS        = lt_root_node_id_for_lcp
   importing
      out_links          = data(lt_root_to_item_link)
      out_data           = lt_item
) .
loop at lt_root_to_item_link assigning field-
symbol (<ls_root_to_item_link>) .
   append <ls_root_to_item_link>-
target_node_id to lt_item_node_id.
endloop.
lo_sales_order_lcp->RETRIEVE_by_association(
   exporting
      IN_BO_NODE_NAME    = ZBO_SALES_ORDER=>item=>CO_NODE_NAME
      in_association_name = ZBO_SALES_ORDER=>item=>CO_ASSOCIATION-LINE_ITEM
      IN_NODE_IDS        = lt_item_node_id
   importing
      out_links          = data(lt_item_to_line_item_link)
      out_data           = lt_line_item
) .
```

Access with the coarse grained interface:

By contrast, according to various embodiments of the present disclosure, the entire BO instance may be retrieved in one single call. Example code for accessing the same data as in the example above, but using a coarse grained interface, might read as follows:
data(lt_sales_order)=zbo_sales_order=>ROOT=>
RETRIEVE_SUBSTRUCTURE
(IT_NODE_ID=LT_ROOT_NODE_ID).

Notice that the method call in the above example of using a deeply structured data type interface consists of the bolded section containing a RETRIEVE_SUBSTRUCTURE call. In the illustrated example, the input parameter to this RETRIEVE call is simply a node identifier corresponding to a "root" node of the substructure. That is, the node that serves as the entry point node of the substructure (i.e., composition sub tree) in the hierarchical data structure of the BO.

By contrast, in the example above which uses node-wise access, each node is retrieved independently using a separate method call. Further, in some cases, in order to identify the proper node, the node's association to other nodes also has to be input.

It will be noted that in some prior implementations it may have been possible for data concerning a number of nodes to be retrieved using one method call, for example, by reading sub node instances using the keys (for example, NODE_IDs) of the parent node along the associations to the sub nodes. If the keys of the subnode instance were known, they could sometimes also be read by a direct RETRIEVE call, for example. However, the prior method calls available for performing such data retrieval from a set if nodes required information to be input into the method call regarding each of the associations to express the hierarchies, and were cumbersome and less convenient to use.

Figure 2A:
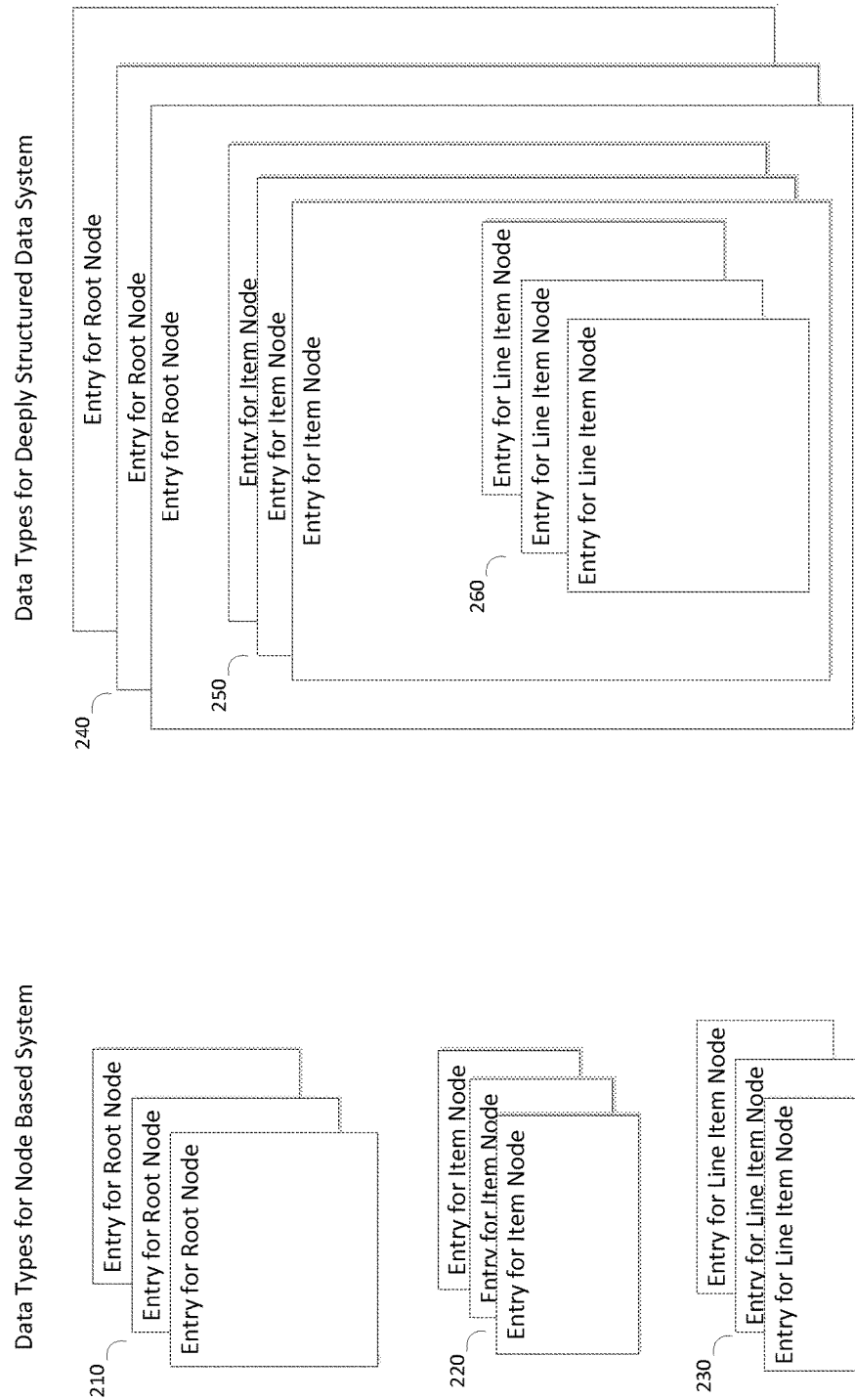
FIG. 2A is a diagrammatic representation comparing single node node-data types with deeply structured data types according to one embodiment of the present disclosure.

FIG. 2A is a diagrammatic representation providing a comparison of the node-wise approach for working with hierarchical BOs, and a deeply structured data type approach, according to various embodiments of the present disclosure.

As depicted in FIG. 2A, as shown on the left hand side, in some implementations of a node-wise system, a separate data access call is needed for each node type (ROOT, ITEM, LINE ITEM). An "entry" in this Figure represents a separate node instance. FIG. 2A illustrates that, in a node-wise approach, a separate data access call may be needed for each node type (ROOT, ITEM, LINE ITEM).

For example, three entries 210 represent three separate root node instances. In addition, three entries 220 represent three separate item node instances (e.g., each corresponding to one of three products ordered in a sales order). Three entries 230 in FIG. 2A represent three separate line-item node instances. These entries (i.e., node instances) are each independent of the others, and no relationships among or between the entries or nodes is recognized by the data calls.

FIG. 2A shows the contrast between such a node-wise system and a deeply structured data type system, which is shown in the right hand side of FIG. 2A. As shown in FIG. 2A, the entries for a deeply structured data type are nested to reflect the relationship among different nodes, the nesting serving to represent the overall hierarchy of the BO instance. The entries for the "leaf" nodes in this structure (e.g., entry 260) are still independent, meaning if a client program wished to access that node it could do so with a separate call relating just to that node. However, the deeply structured data system also includes intermediate entries such as entries 240 and 250 which themselves include another one or more entries. This nesting structure provides the ability to access data in an entire substructure of a BO instance in one method call. For example, in FIG. 2B, each of the sub node levels has three entries. In various embodiments, the entries in FIG. 2B having this nested structure represent the deeply structured data types referred to herein.

Figure 2B:
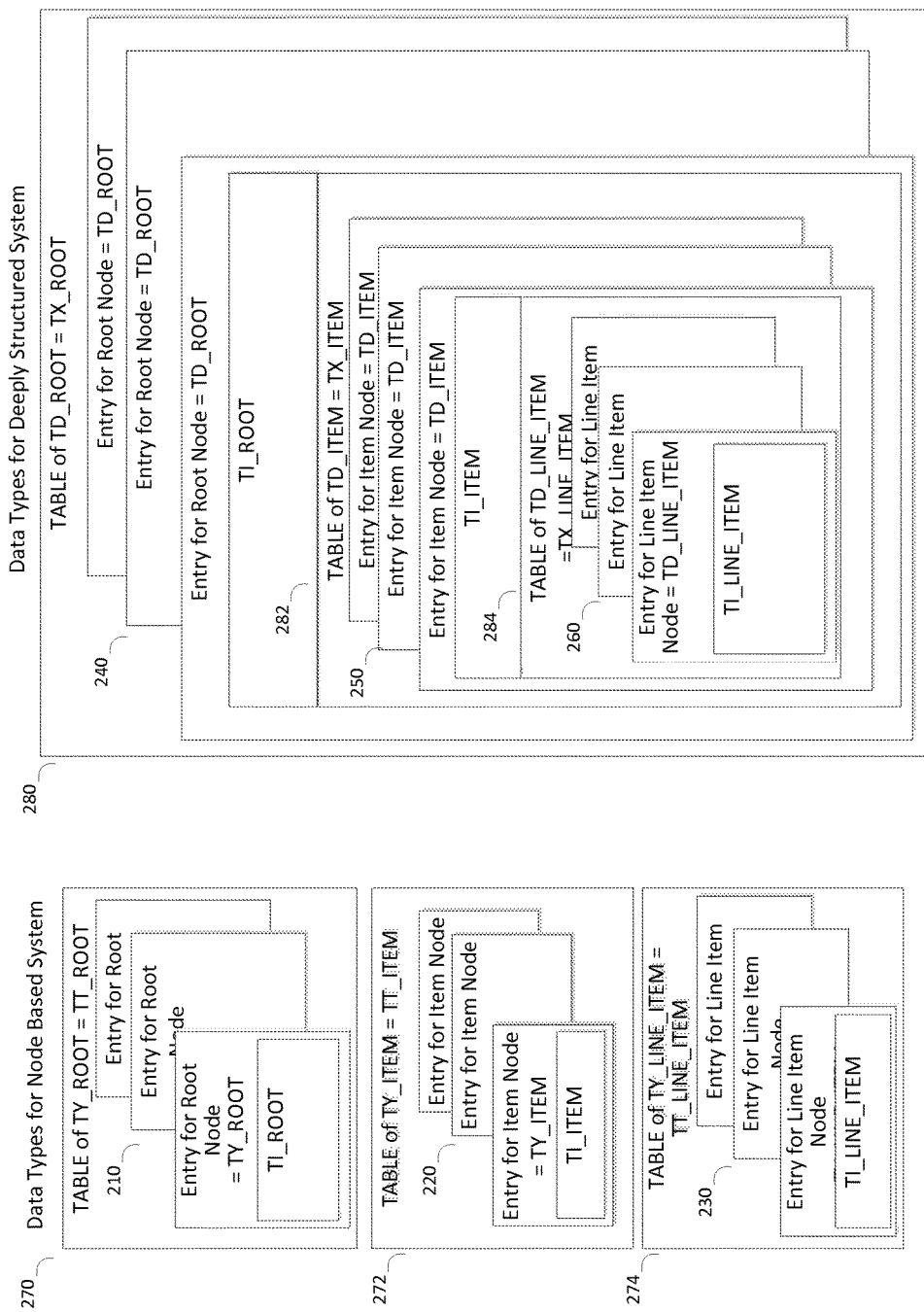
FIG. 2B is a diagrammatic representation comparing single node node-data types with deeply structured data types according to one embodiment of the present disclosure.

FIG. 2B depicts the same elements as FIG. 2A but with the addition of data type information showing designations of the different data substructure types according to one embodiment of the present disclosure. Notice that new elements 270, 272, 274, and 280, 282, and 284, have been added to represent the different tables used to contain a set of entries according to one embodiment of the present disclosure. Element numbers 270, 272, and 274 represent data types that may be available to do mass-enabled accesses on one node type.

As noted above, the nested structure could be represented or stored in a variety of different ways in a data system. For example, in some embodiments, the tables could take the form of arrays.

Figure 3:
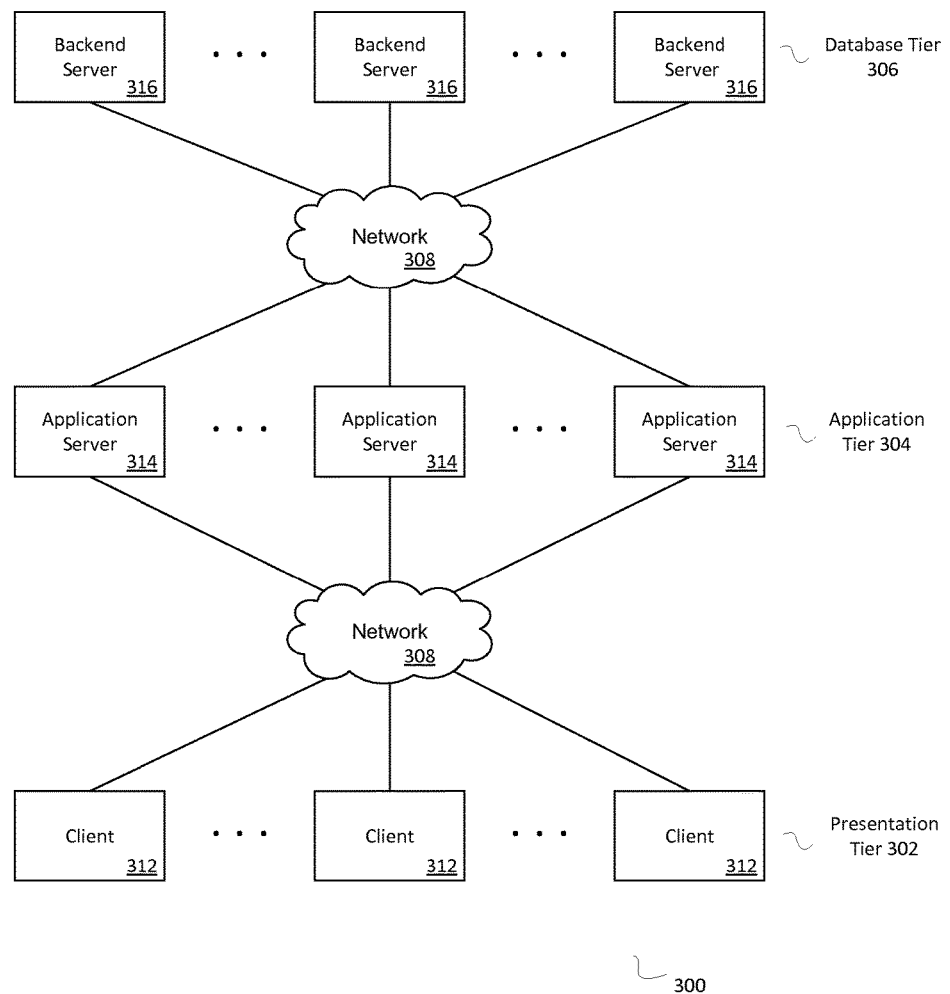
FIG. 3 a block diagram presenting a network topology according to one embodiment of the present disclosure.

Turning to FIG. 3 a network topology comprising hardware and software components of a network topology 300 according to one embodiment of the present disclosure is illustrated. The network topology presented comprises a three tier architecture consisting of a presentation tier 302, an application tier 304, and a backend tier 306. A network 308 connects the devices within and between the tiers. The network 308 may include one or more networks, such as a local area network, a wide area network, or the Internet.

The presentation tier 302 generally includes one or more client computers 312. The client computers 312 generally provide a graphical user interface for users to interact with the other parts of the system 300. The user interface may be implemented by a browser, for example, a Java application.

The application tier 304 generally includes one or more application servers 314. The application servers 314 generally implement the business logic for processing interactions between the users and the underlying data. This business logic is generally referred to as "the application", "the application program" or the "service provider logic".

The application tier 304 may implement various applications to perform various functions, such as invoicing, inventory control, supply chain management, etc. Various of the application servers 314 may perform different functions. For example, one of the application servers 314 may be used for prototyping or development, while the others may be used for business intelligence production activities.

The backend tier 306 generally includes one or more backend servers 316. The backend servers 316 generally implement a database management system that stores and manipulates the underlying data and related metadata. This database management system is generally referred to as "the database" or "the database system" or "the database program". The backend servers 316 may implement various types of database systems, including DB2, Informix, SAP MaxDB, Oracle and Microsoft SQL Server™.

Although many separate devices are shown in each tier, such is mainly for illustration purposes to show scalability. For example, a single backend server may be used in the basic configuration, but as the amount of data in the databases increases, the number of backend servers 316 may be increased. As another example, a single application server may be used in the basic configuration, but as the amount of business logic processes increases, the number of application servers 314 may be increased. Furthermore, in certain embodiments the tiers may be combined on a single computing device. For example, a single computing device may have multiple processors or multiple blades; one blade may implement a backend server and another blade may implement an application server. In another embodiment, a single backend server 316 and a single application server 314 may be implemented by a single computing device.

The system 300 may be implemented in a variety of operating systems, for example, UNIX (AIX, HP-UX, Solaris, Linux), Microsoft Windows, IBM Series i (former iSeries, AS/400) and IBM zSeries (former S/390). The various devices in the various tiers may implement different operating systems. For example, a client computer 312 may run Microsoft Windows™ and an application server 314 may implement Linux. Note that various devices generally implement both an operating system program and another program, which are distinct. For example, a client computer 312 may implement Microsoft Windows™ (operating system) and Microsoft Internet Explorer™ (user interface program). An application server 314 may implement Linux (operating system) and an invoicing system (application program). A database serve 316 may implement Linux (operating system) and Oracle database (database program).

Figure 4:
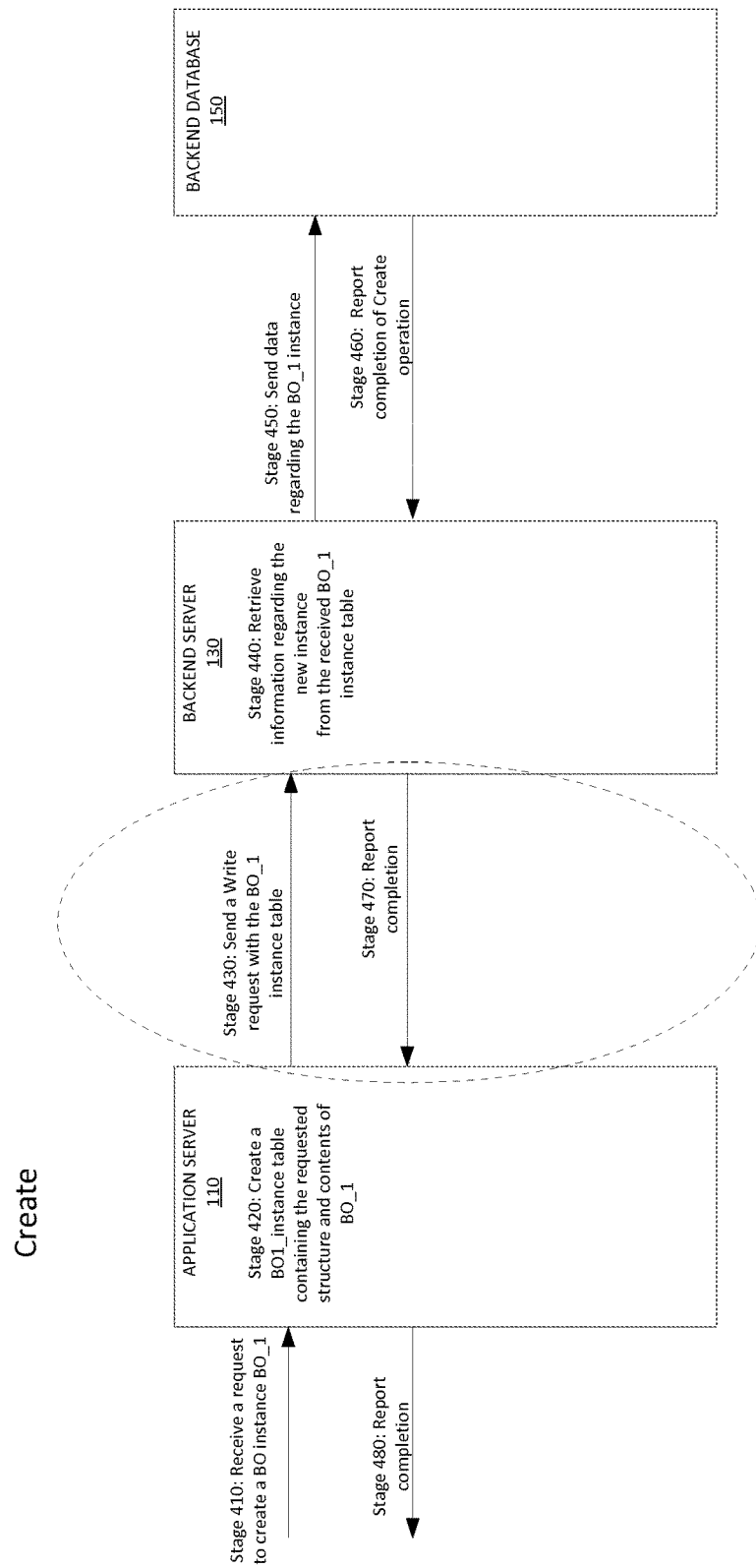
FIG. 4 is a functional block diagram illustrating a procedure for creating a new BO instance in accordance with one embodiment of the present disclosure.

FIG. 4 is a functional block diagram illustrating a procedure 400 for creating a new BO instance in accordance with one embodiment of the present disclosure.

The create process 400 is depicted in FIG. 4 with reference to different stages of a process in a create operation. It will be understood though that the sequence of actions depicted in FIG. 4 is only intended to provide one example embodiment. Other embodiments with a different sequence of events or stages, or with particular events or stages left out, may still reflect the spirit behind various embodiments of the present disclosure.

As illustrated in FIG. 4, at stage 410, an application server 110 receives a request from a user or other initiating entity to create a BO instance BO_1.

At stage 420, the application server generates a BO1_instance table containing the requested structure and contents of BO_1

At stage 430, the application server sends a create request with the generated BO1_instance table.

At stage 440, backend server 130 receives the create request and retrieves information regarding the new instance from the BO1_instance table. Note that service provider logic 132 of backend server 130 may also execute determinations and validations before it sends data to backend server 150. In some embodiments, "determinations" may consist of calculations for "enriching" the data received from a client. For example, consider a total price for a sales order provided at a root node. In some cases, a company may give a discount for regular customers. In such cases, BO service provider logic 132 may determine the effective price of the sales order by performing a calculation that takes into account the prices of the ordered products, the discount, shipping, taxes, etc. In some embodiments, "validations" may consist of check the consistency of data.

At stage 450, the backend server 130 sends data regarding the new instance along with a create request to backend database 150.

In stage 460, backend database 150 reports completion of the create operation to backend server 130.

In stage 470, the backend server reports completion of the operation to the application server.

In stage 480, application server 110 reports completion of the create operation to the other or other initiating entity.

Figure 5:
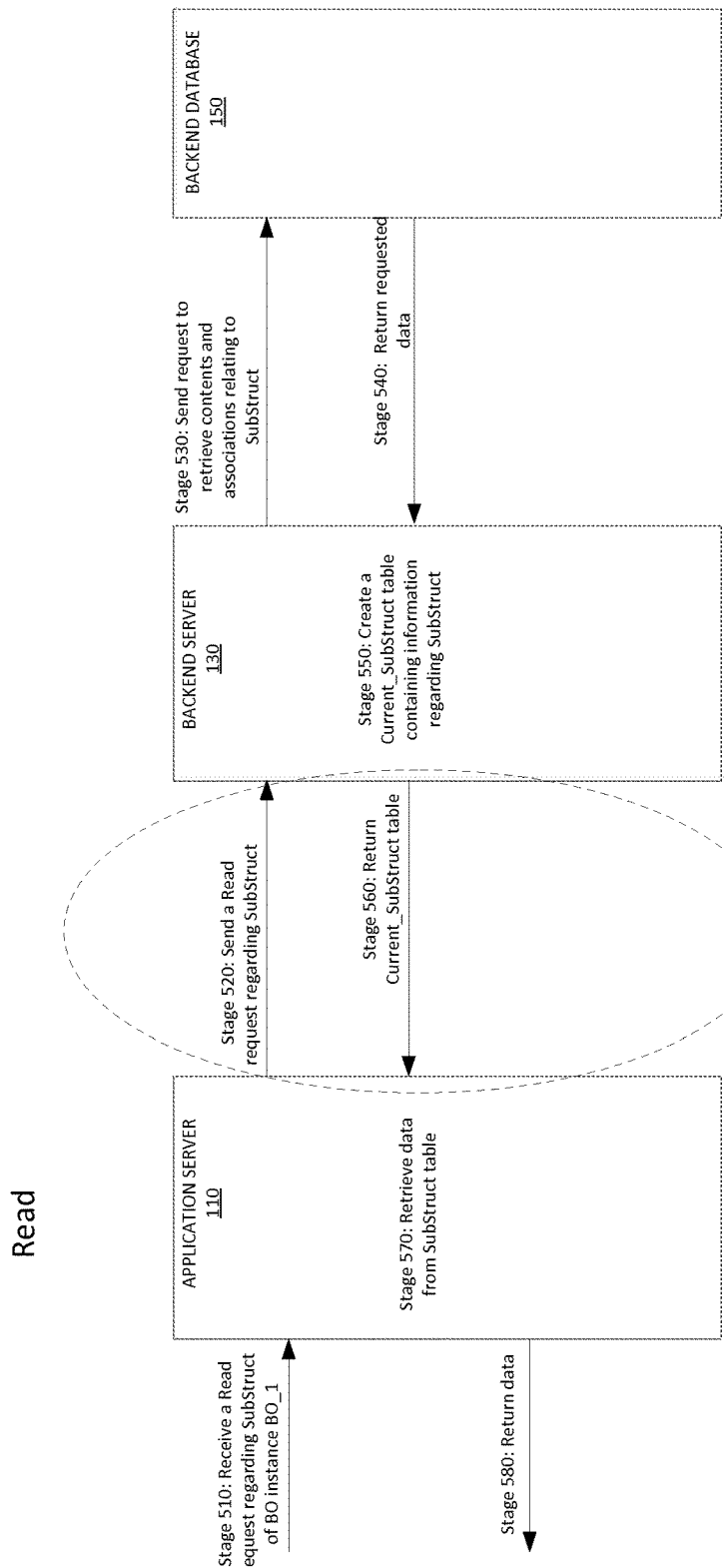
FIG. 5 is a functional block diagram illustrating a procedure for reading a substructure of a BO instance in accordance with one embodiment of the present disclosure.

FIG. 5 is a flow diagram illustrating a procedure 500 for reading data in a backend system operating on a platform that provides deeply structured data types, in accordance with one embodiment of the present disclosure.

The improved encryption scheme's write process is depicted in FIG. 5 with reference to different stages. It will be understood that the sequence of actions depicted in FIG. 5 is intended to provide one example embodiment. Other embodiments with a different sequence of events or stages, or with particular events or stages left out, may still reflect the spirit behind various embodiments of the present disclosure.

Further, it will be understood that the particular configuration of entities depicted in FIG. 5 could be altered without departing from the spirit of various embodiments of the present disclosure.

As illustrated in FIG. 5, at 510, application server 110 receives a read request regarding a substructure, SubStruct, of BO instance BO_1

At stage 520, application server 110 sends a request to read SubStruct to backend server 130.

At stage 530, backend server 130 receives the request and sends a request to retrieve contents and associations relating to SubStruct to backend database 150 if needed.

In some embodiments, service provider logic 132 in backend server 130 both accesses backend database 150 and determines what data needs to be read from database 150 and what data is already available in transactional buffer 134 or cached so that a database access is not required. This avoids unnecessary runtime overheads. For example, if backend server 530 has modified data in transactional buffer 134 or has already read the object from the database and already stored it in a cache, it may not send access database 150 at stage 530 but return data (to application server 110) which is stored in transactional buffer 134 or a data cache.

At stage 540, backend database 150 returns the requested data.

At stage 550, backend server 130 creates a substructure table, Current_SubStruct, containing information regarding SubStruct.

At stage 560, backend server 130 transmits the Current_SubStruct table to application server 110.

At stage 570, application server 110 receives the Current_SubStruct table and retrieves data from the SubStruct table At stage 580, application server 110 provides the data to the user or other Read initiating entity.

Figure 6:
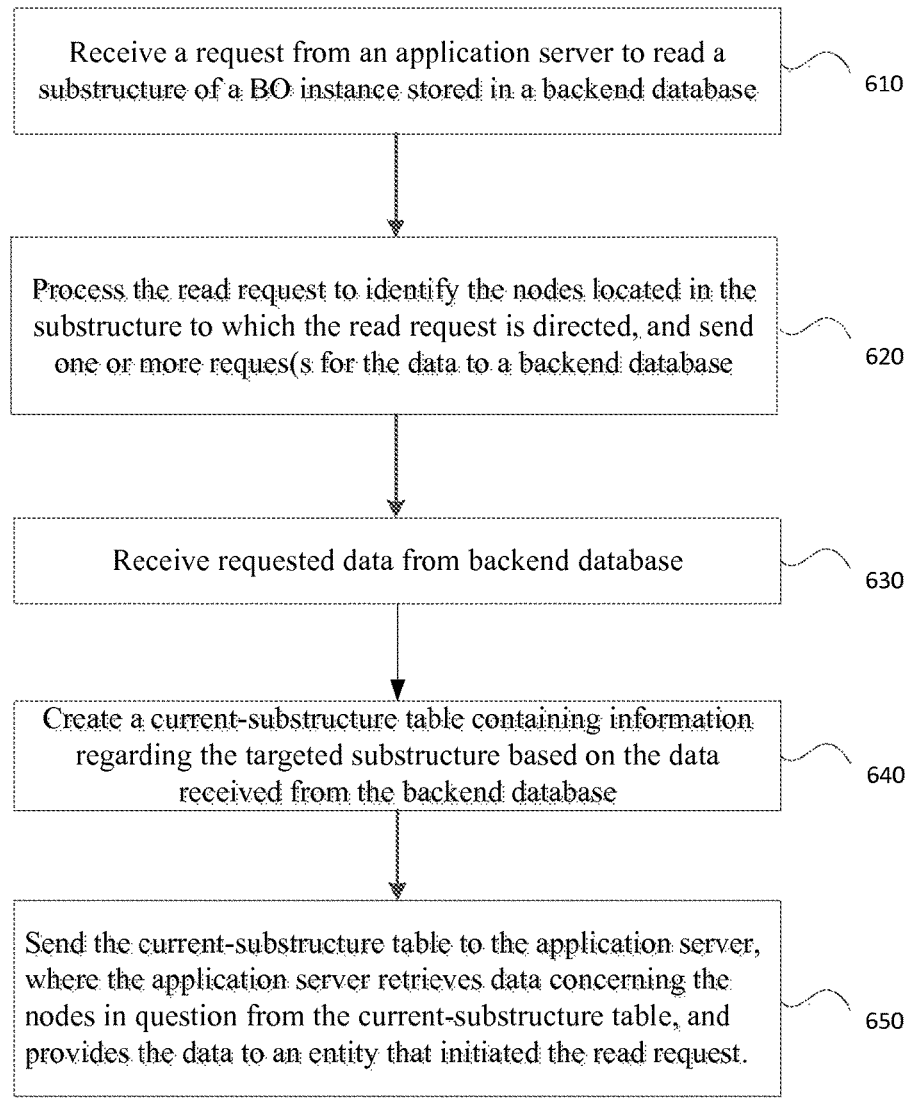
FIG. 6 is a flow diagram illustrating a procedure for reading a substructure of a BO instance in accordance with one embodiment of the present disclosure.

FIG. 6 is a flow diagram illustrating a procedure for performing a read operation in the context of an improved client interface for accessing complex data structures in accordance with one embodiment of the present disclosure.

At 610, a request from an application server to read a substructure of a BO instance stored in a backend database is received at a backend server.

At 620, the read request is processed by the backend server to identify the nodes located in the substructure to which the read request is directed, and the backend server sends request(s) for the data to the backend database. The request(s) may include a plurality of access calls and pertain both to attribute and association data relating to the nodes in the targeted substructure.

At 630, the requested data is received from the backend database.

At 640, a current-substructure table containing information regarding the current data in the targeted substructure is created by the backend server. The current-substructure table may include information regarding both attribute and association information corresponding to the nodes in the targeted substructure.

At 650, the backend server sends the current-substructure table to the application server. The application server once it receives the current-substructure table, retrieves data concerning the nodes in question from the table, and provides the data to an entity that initiated the read request.

Figure 7:
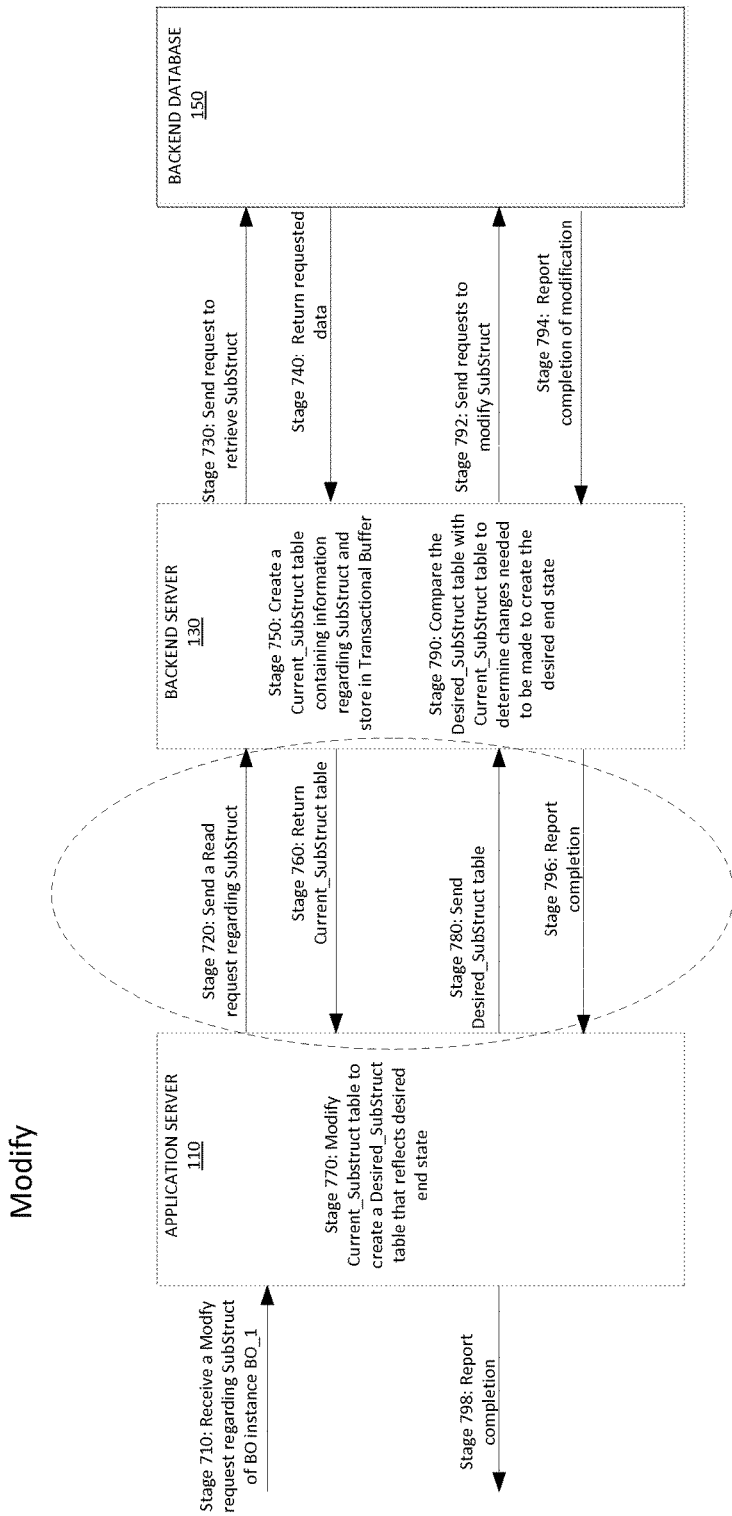
FIG. 7 is a functional block diagram illustrating a procedure for modifying a substructure of a BO instance in accordance with one embodiment of the present disclosure.

FIG. 7 is a block diagram illustrating a procedure for modifying data in a backend system operating on a platform that provides deeply structured data types, in accordance with one embodiment of the present disclosure.

The improved modify process is depicted in FIG. 7 with reference to different stages. It will be understood that the sequence of actions depicted in FIG. 7 is intended to provide one example embodiment. Other embodiments with a different sequence of events or stages, or with particular events or stages left out, may still reflect the spirit behind various embodiments of the present disclosure.

Further, it will be understood that the particular configuration of entities depicted in FIG. 7 could be altered without departing from the spirit of various embodiments of the present disclosure.

As illustrated in FIG. 7, at stage 710, application server 110 receives a Modify request from a user or other entity regarding a substructure, SubStruct, of BO instance BO_1

At stage 720, application server 110 sends a Read request to backend server 130 regarding SubStruct.

At stage 730, backend server 130 send a request to retrieve SubStruct to backend database 150.

At stage 740, backend database 150 returns the requested data to backend server 130.

At stage 750, backend server 130 creates a Current_SubStruct table containing information regarding SubStruct and stores the table in transactional buffer 134.

At stage 760, backend server 130 sends the Current_SubStruct table to application server 110.

At stage 770, application server 110 receives the Current_SubStruct table and modifies it to reflect the end state requested in the Modify request. As a result of this process a Desired_SubStruct table is generated.

At stage 780, application server 100 sends the Desired_SubStruct table to backend server 130.

At stage 790, backend server 130 compares the Desired_SubStruct table with the Current_SubStruct table to determine the changes that needed to be made to the BO instance BO_1 to achieve the end state requested by the user or other entity initiating the Modify operation. This comparison process may be performed by service provider logic 132 contained in backend server 130 and using transactional buffer 134.

At stage 792, based on determinations made in stage 790, backend server sends requests to modify SubStruct to backend database 150.

At stage 794, backend database 150 reports completion of the modification operation to backend server 110.

At stage 796, backend server 130 reports completion of the modification operation to application server 110.

At stage 798, application server 110 reports completion of the modification operation to the user or other entity initiating the Modify operation.

Figure 8:
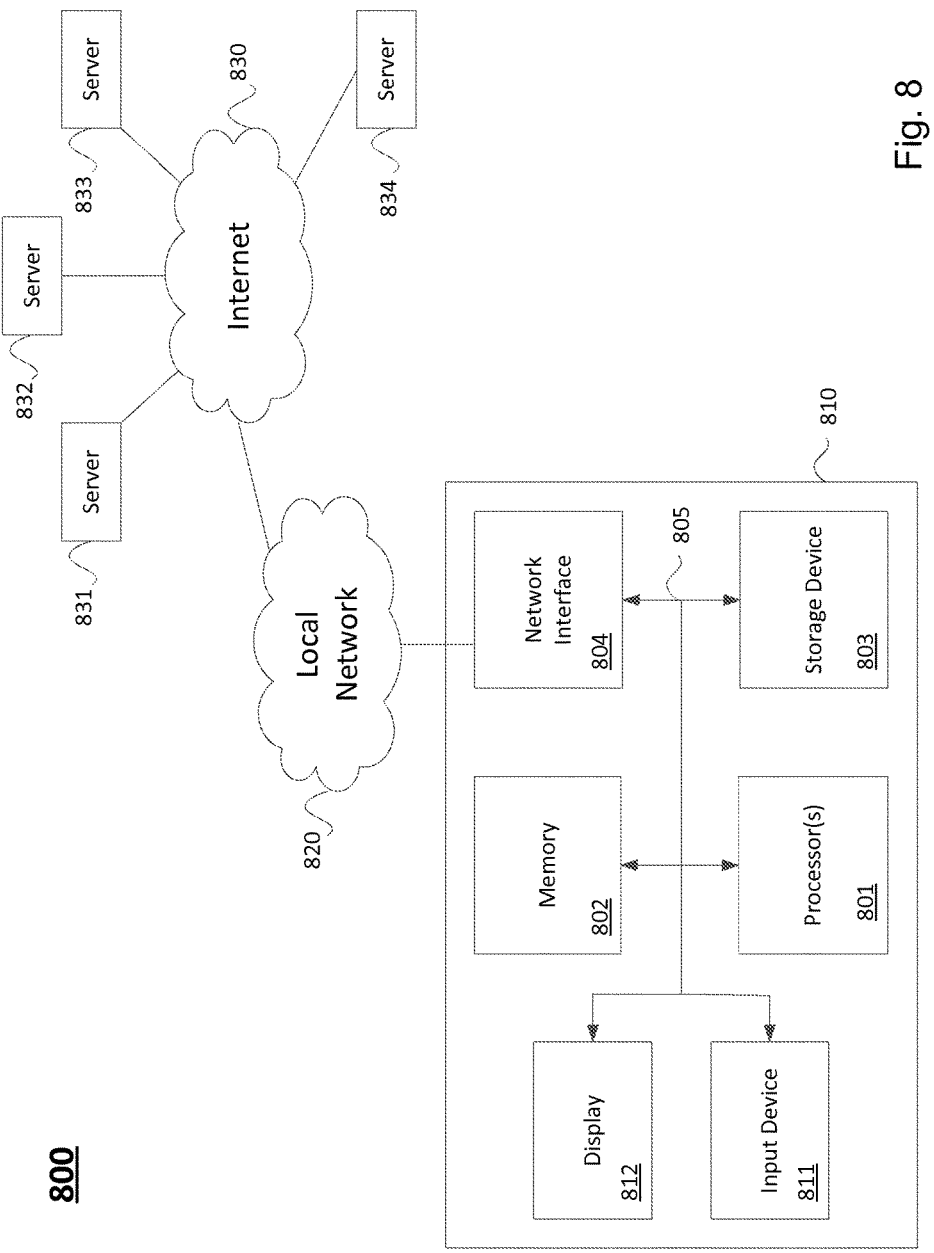
FIG. 8 illustrates hardware of a special purpose computing machine configured to perform a process in accordance with one embodiment of the present disclosure.

FIG. 8 illustrates hardware of a special purpose computing machine configured with a process according to the above disclosure. The following hardware description is merely one example. It is to be understood that a variety of computers topologies may be used to implement the above described techniques. An example computer system 810 is illustrated in FIG. 8. Computer system 810 includes a bus 805 or other communication mechanism for communicating information, and one or more processor(s) 801 coupled with bus 805 for processing information. One or more processor(s) 801 may take various forms including microcontrollers and microprocessors such as programmable devices (e.g., CPLDs and FPGAs) and unprogrammable devices such as gate array ASICs or general purpose microprocessors. Computer system 810 also includes a memory 802 coupled to bus 805 for storing information and instructions to be executed by processor 801, including information and instructions for performing some of the techniques described above, for example. This memory may also be used for storing programs executed by processor 801. Memory 802 may comprise a single or multiple storage components or devices. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory may both include any suitable non-transitory computer-readable media such as those described herein. Memory 802 and storage device 803 may comprise a single or multiple memory or storage components or devices, respectively.

Computer system 810 may be coupled via bus 805 to an output device 812 for providing information to a computer user. Output device 812 may take the form of a display or speakers, for example. An input device 811 such as a keyboard, touchscreen, mouse, and/or microphone, may be coupled to bus 805 for communicating information and command selections from the user to processor 801. The combination of these components allows the user to communicate with the system. In some systems, bus 705 may represent multiple specialized buses, for example.

Computer system 810 also includes a network interface 804 coupled with bus 805. Network interface 804 may provide two-way data communication between computer system 810 and a local network 820. The network interface 804 may be a wireless or wired connection, for example. Computer system 810 may send and receive information through the network interface 804 across a local area network, an Intranet, a cellular network, or the Internet, for example. One example implementation may include computing system 810 acting as a backend server that performs steps relating to providing a deeply structured data type client interface. In the Internet example, computing system 810 may be accessed by the mobile devices through a wireless connection to the Internet, for example, and computing system 810 may access data and features on backend systems that may reside on multiple different hardware servers 831-835 across the network. Servers 831-835 and server applications may also reside in a cloud computing environment, for example. Various embodiments may be practiced in a wide variety of network environments including, for example, TCP/IP-based networks, telecommunications networks, cellular communications networks, wireless networks, etc., or combinations of different network types.

As noted above, the apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described herein. Examples of such computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM).

In addition, the computer program instructions with which various embodiments of the present disclosure are implemented may be executed according to a variety of computing models including a client/server model, a peer-to-peer model, on a stand-alone computing device, or according to a distributed computing model in which various functions described herein may be performed at different locations.

The above description illustrates various embodiments of the present disclosure along with examples of how aspects of various embodiments of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of various embodiments of the present disclosure as defined by the claims.

What is claimed:

1. A method comprising:
   at a backend server configured to process data stored across a plurality of hierarchical nodes in data objects in response to single service calls received on an application server, wherein the data objects are stored in a backend database, wherein the data objects are instances of a plurality of structured data types derived from class definitions for different data objects, each structured data type having a hierarchical structure comprising a plurality of nodes for storing data, each of the structured data types comprising an operation for reading a plurality of nodes in a corresponding data object instance using a single method, wherein the single method comprises an input parameter specifying a node identifier corresponding to the root node and wherein the node identifier corresponding to the root node is the only input parameter for the single method,
   in response to the single service call corresponding to the single method comprising a read request, the backend server:
      receiving, from the application server, a request to access a first data object stored in the backend database, wherein the first data object is an instance of a first structured data type of the plurality of structured data types, wherein the single service call designates one node of the plurality of nodes of the first structured data type as a root node for the first data object to be accessed, and the single service call is configured to access the designated root node of the first data object and corresponding sub nodes; and
      identifying the sub nodes across a plurality of hierarchical levels below the root node of the first data object to be accessed;
      requesting data from the backend database for the root node and the identified sub nodes of the first data object;
      receiving the requested data from the backend database;
      generating a table containing the requested data; and transmitting the table to the application server.

2. The method of claim 1, wherein the application server retrieves data from the table, and provides the data to an entity that initiated the read request.

3. The method of claim 1, wherein the table is a current substructure table created by the backend server, wherein the table includes information relating to attribute and association information corresponding to the sub nodes of the first data object.

4. The method of claim 1, wherein each of the structured data types comprising an operation for modifying a plurality of nodes in a corresponding data object instance using a single method, and wherein in response to the single service call comprising the modify request, the backend server:
   receiving, from the application server, a request to read data from a first data object;
   sending the request to read data from the first data object to the backend database;
   receiving the requested data from the backend database;
   creating a first table containing the requested data;
   sending the first table to the application server;
   receiving, from the application server, a second table containing requested data modified according to the modify request;
   comparing the first table and the second table to determine changes to be made to first data object; and
   sending a request to modify the first data object according to the determined changes to the backend database.

5. The method of claim 1, wherein the single service call is not required to include information regarding relationships between different sub nodes of the complex data structure instance.

6. The method of claim 1 wherein the single service call includes a table specifying data assignments and node structure of the data object to be accessed to create a desired end-state.

7. The method of claim 1, wherein the node identifier corresponding to the root node is a subnode.

8. The method of claim 1, wherein each of the structured data types further comprises an operation for creating, deleting, or modifying corresponding data objects having a plurality of hierarchical nodes using a single method.

9. A computer system comprising:
   one or more processors; and
   a memory configured to store one or more computer programs executable by the processors to perform operations, the operations comprising:
   configuring a backend server to process data stored across a plurality of hierarchical nodes in data objects in response to single service calls received on an application server, wherein the data objects are stored in a backend database, wherein the data objects are instances of a plurality of structured data types derived from class definitions for different data objects, each structured data type having a hierarchical structure comprising a plurality of nodes for storing data, each of the structured data types comprising an operation for reading a plurality of nodes in a corresponding data object instance using a single method, wherein the single method comprises an input parameter specifying a node identifier corresponding to the root node and wherein the node identifier corresponding to the root node is the only input parameter for the single method,
   wherein, in response to the single service call corresponding to the single method comprising a read request, the backend server:

receives, from the application server, a request to access a first data object stored in the backend database, wherein the first data object is an instance of a first structured data type of the plurality of structured data types, wherein the single service call designates one node of the plurality of nodes of the first structured data type as a root node for the first data object to be accessed, and the single service call is configured to access the designated root node of the first data object and corresponding sub nodes; and identifies the sub nodes across a plurality of hierarchical levels below the root node of the first data object to be accessed;

requests data from the backend database for the root node and the identified sub nodes of the first data object;

receives the requested data from the backend database;

generates a table containing the requested data; and transmits the table to the application server.

10. The computer system of claim 9, wherein the application server retrieves data from the table, and provides the data to an entity that initiated the read request.

11. The computer system of claim 9, wherein the table is a current substructure table created by the backend server, wherein the table includes information relating to attribute and association information corresponding to the sub nodes of the first data object.

12. The computer system of claim 9, wherein each of the structured data types comprising an operation for modifying a plurality of nodes in a corresponding data object instance using a single method, and wherein in response to the single service call comprising the modify request, the backend server:

receiving, from the application server, a request to read data from a first data object;

sending the request to read data from the first data object to the backend database;

receiving the requested data from the backend database;

creating a first table containing the requested data;

sending the first table to the application server;

receiving, from the application server, a second table containing requested data modified according to the modify request;

comparing the first table and the second table to determine changes to be made to first data object; and sending a request to modify the first data object according to the determined changes to the backend database.

13. The computer system of claim 9, wherein the single service call is not required to include information regarding relationships between different sub nodes of the complex data structure instance.

14. A non-transitory computer readable storage medium storing one or more programs, the one or more programs comprising instructions for performing operations comprising:

configuring a backend server to process data stored across a plurality of hierarchical nodes in data objects in response to single service calls received on an application server, wherein the data objects are stored in a backend database, wherein the data objects are instances of a plurality of structured data types derived from class definitions for different data objects, each structured data type having a hierarchical structure comprising a plurality of nodes for storing data, each of the structured data types comprising an operation for reading a plurality of nodes in a corresponding data object instance using a single method, wherein the single method comprises an input parameter specifying a node identifier corresponding to the root node and wherein the node identifier corresponding to the root node is the only input parameter for the single method, wherein, in response to the single service call corresponding to the single method comprising a read request, the backend server:

receives, from the application server, a request to access a first data object stored in the backend database, wherein the first data object is an instance of a first structured data type of the plurality of structured data types, wherein the single service call designates one node of the plurality of nodes of the first structured data type as a root node for the first data object to be accessed, and the single service call is configured to access the designated root node of the first data object and corresponding sub nodes; and identifies the sub nodes across a plurality of hierarchical levels below the root node of the first data object to be accessed;

requests data from the backend database for the root node and the identified sub nodes of the first data object;

receives the requested data from the backend database;

generates a table containing the requested data; and transmits the table to the application server.

15. The non-transitory computer readable storage medium of claim 14, wherein the application server retrieves data from the table, and provides the data to an entity that initiated the read request.

16. The non-transitory computer readable storage medium of claim 14, wherein the table is a current substructure table created by the backend server, wherein the table includes information relating to attribute and association information corresponding to the sub nodes of the first data object.

17. The non-transitory computer readable storage medium of claim 14, wherein each of the structured data types comprising an operation for modifying a plurality of nodes in a corresponding data object instance using a single method, and wherein in response to the single service call comprising the modify request, the backend server:

receiving, from the application server, a request to read data from a first data object;

sending the request to read data from the first data object to the backend database;

receiving the requested data from the backend database;

creating a first table containing the requested data;

sending the first table to the application server;

receiving, from the application server, a second table containing requested data modified according to the modify request;

comparing the first table and the second table to determine changes to be made to first data object; and sending a request to modify the first data object according to the determined changes to the backend database.

* * * * *